United States Patent
Chen et al.

(10) Patent No.: US 11,565,708 B2
(45) Date of Patent: Jan. 31, 2023

(54) AUTONOMOUS DRIVING VEHICLE HEALTH MONITORING

(71) Applicant: Pony AI Inc., Grand Cayman (KY)

(72) Inventors: Kai Chen, San Jose, CA (US); Pingfan Meng, Fremont, CA (US)

(73) Assignee: Pony AI Inc., Grand Cayman (KY)

( * ) Notice: Subject to any disclaimer, the term of this patent is extended or adjusted under 35 U.S.C. 154(b) by 163 days.

(21) Appl. No.: 17/073,980

(22) Filed: Oct. 19, 2020

(65) Prior Publication Data

US 2022/0118991 A1    Apr. 21, 2022

(51) Int. Cl.
*B60W 50/029*    (2012.01)
*B60W 50/02*     (2012.01)
*B60W 50/038*    (2012.01)

(52) U.S. Cl.
CPC ...... *B60W 50/029* (2013.01); *B60W 50/0205* (2013.01); *B60W 50/038* (2013.01); *B60W 2050/021* (2013.01); *B60W 2050/0297* (2013.01)

(58) Field of Classification Search
CPC .......... B60W 50/029; B60W 50/0205; B60W 50/038; B60W 2050/021; B60W 2050/0297
See application file for complete search history.

(56) References Cited

U.S. PATENT DOCUMENTS 9,195,232 B1 *   11/2015   Egnor ................. G05D 1/0055
2020/0201335 A1 *  6/2020   Somers ........... B60W 60/00186

* cited by examiner

Primary Examiner — Nicholas Kiswanto
Assistant Examiner — Jamal A Shah

(57) ABSTRACT

Described herein are systems, methods, and non-transitory computer-readable media for isolating commercial components from a harsh vehicle operating environment to increase the longevity of such components and to decrease their failure rate. Also described herein are systems, methods, and non-transitory computer-readable media for monitoring the operational health status of vehicle components for failure, and upon detecting failure of a component, initiating a processing task reassignment and fault recovery process. In this manner, processing load handled by the component prior to failure can be offloaded to one or more other vehicle components while a fault recovery process is initiated for the component. When the failed component is operational again, the vehicle may revert back to the task assignment in place prior to the component failure, may continue with the current task assignment, or may transition to another different task reassignment.

20 Claims, 5 Drawing Sheets ately, in some embodiments, to adjusting task assignment among autonomous driving vehicle components based on the monitored operational health of the vehicle components.

AUTONOMOUS DRIVING VEHICLE HEALTH MONITORING

The present invention relates generally to vehicle component operational health monitoring, and more particularly, in some embodiments, to adjusting task assignment among autonomous driving vehicle components based on the monitored operational health of the vehicle components.

BACKGROUND

Modern vehicles include a myriad of different vehicle components. Automated vehicle technologies have advanced dramatically in the last few decades, and the number of vehicle components needed to support such technologies has grown commensurately. In particular, modern vehicles include more sensors, more processing circuits, and so forth than in the past in order to support more advanced technologies such as adaptive cruise control, blind spot detection, lane keeping, object avoidance, and the like. Autonomous vehicles include an even greater number of vehicle components in order to support the more complex processing (e.g., object detection, instance segmentation, automated vehicle navigation, etc.) needed to enable autonomous vehicle operation.

Vehicle components, such as those in an autonomous vehicle, may include a variety of types of components having different tolerances for harsh operating environments within the vehicle. Further, vehicle components may exhibit different rates of failure. Described herein are technical solutions that address technical problems associated with vehicle component failure and vehicle component intolerance to harsh operating conditions in a vehicle.

SUMMARY

In an example embodiment, a computer-implemented method for vehicle component fault detection is disclosed. The method includes monitoring a health status of a first vehicle component over a period of time, detecting failure of the first vehicle component, and determining a failure level associated with the failure of the first vehicle component. The method further includes determining a vehicle component task reassignment based at least in part on the failure level and a component type of the first vehicle component and implementing the vehicle component task reassignment. Implementing the vehicle component task reassignment includes offloading at least a portion of the task processing performed by the first vehicle component prior to failure to a second vehicle component, where an operational health of the second vehicle component satisfies one or more operational health criteria.

In an example embodiment, detecting the failure of the first vehicle component includes determining that a latency associated with the task processing performed by the first vehicle component has increased by at least a threshold amount during the period of time.

In an example embodiment, determining the failure level associated with the failure of the first vehicle component includes determining a latency associated with the task processing performed by the first vehicle component subsequent to the failure of the first vehicle component or an amount of latency increase associated with the failure of the first vehicle component and determining the failure level from a mapping of failure levels to latency ranges or ranges of latency changes.

In an example embodiment, determining the vehicle component task reassignment includes determining that a component type of the second vehicle component matches the component type of the first vehicle component and determining that offloading the at least a portion of the task processing performed by the first vehicle component prior to failure to the second vehicle component would satisfy minimum vehicle operational requirements.

In an example embodiment, determining that offloading the at least a portion of the task processing performed by the first vehicle component prior to failure to the second vehicle component would satisfy minimum vehicle operational requirements includes determining a change in latency associated with the second vehicle component performing the at least a portion of the task processing instead of the first vehicle component, determining that the change in latency requires a corresponding change in a vehicle speed, and determining that the change in the vehicle speed is less than a threshold maximum vehicle speed change.

In an example embodiment, any of the above-described embodiments further includes initiating the change in the vehicle speed in connection with implementing the vehicle component task reassignment.

In an example embodiment, determining the vehicle component task reassignment includes identifying a third vehicle component associated with a component type that is the same as the component type of the first vehicle component, determining that offloading the at least a portion of the task processing performed by the first vehicle component prior to failure to the third vehicle component would result in at least a threshold amount of performance degradation for the third component, identifying the second vehicle component, where a component type of the second vehicle component is different from the component type of the first vehicle component, and determining that the operational health of the second vehicle component satisfies one or more operational health criteria.

In an example embodiment, determining that the operational health of the second vehicle component satisfies one or more operational health criteria includes determining that the second vehicle component has at least a threshold amount of available processing capacity.

In an example embodiment, determining that the operational health of the second vehicle component satisfies one or more operational health criteria includes determining that offloading the at least a portion of the task processing performed by the first vehicle component prior to failure to the second vehicle component would result in less than the threshold amount of performance degradation.

Any of the above-described embodiments may further include performing a real-time fault diagnosis for the first vehicle component, initiating a fault recovery process for the first vehicle component, determining that an operational health of the first vehicle component has been restored to at least a threshold operational health level, and reverting back to a vehicle component task assignment prior to the failure of the first vehicle component, where reverting back to the vehicle component task assignment includes reassigning the at least a portion of the task processing from the second vehicle component back to the first vehicle component.

In an example embodiment, a system for vehicle component fault detection is disclosed. The system includes at least one processor and at least one memory storing computer-executable instructions. The at least one processor is configured to access the at least one memory and execute the computer-executable instructions to perform a set of operations including monitoring a health status of a first vehicle component over a period of time, detecting failure of the first vehicle component, and determining a failure level associated with the failure of the first vehicle component. The set of operations further includes determining a vehicle component task reassignment based at least in part on the failure level and a component type of the first vehicle component and implementing the vehicle component task reassignment. Implementing the vehicle component task reassignment includes offloading at least a portion of the task processing performed by the first vehicle component prior to failure to a second vehicle component, where an operational health of the second vehicle component satisfies one or more operational health criteria. The above-described system is further configured to perform any of the operations/functions and may include any of the additional features/aspects of example embodiments of the invention described above in relation to example computer-implemented methods of the invention.

In an example embodiment, a computer program product for vehicle component fault detection is disclosed. The computer program product includes a non-transitory computer-readable medium storing computer/machine-executable instructions that responsive to execution by a processing circuit including one or more processing units cause a method to be performed. This method includes monitoring a health status of a first vehicle component over a period of time, detecting failure of the first vehicle component, and determining a failure level associated with the failure of the first vehicle component. The method further includes determining a vehicle component task reassignment based at least in part on the failure level and a component type of the first vehicle component and implementing the vehicle component task reassignment. Implementing the vehicle component task reassignment includes offloading at least a portion of the task processing performed by the first vehicle component prior to failure to a second vehicle component, where an operational health of the second vehicle component satisfies one or more operational health criteria. The above-described computer program product is further configured to perform any of the operations/functions and may include any of the additional features/aspects of example embodiments of the invention described above in relation to example computer-implemented methods of the invention.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
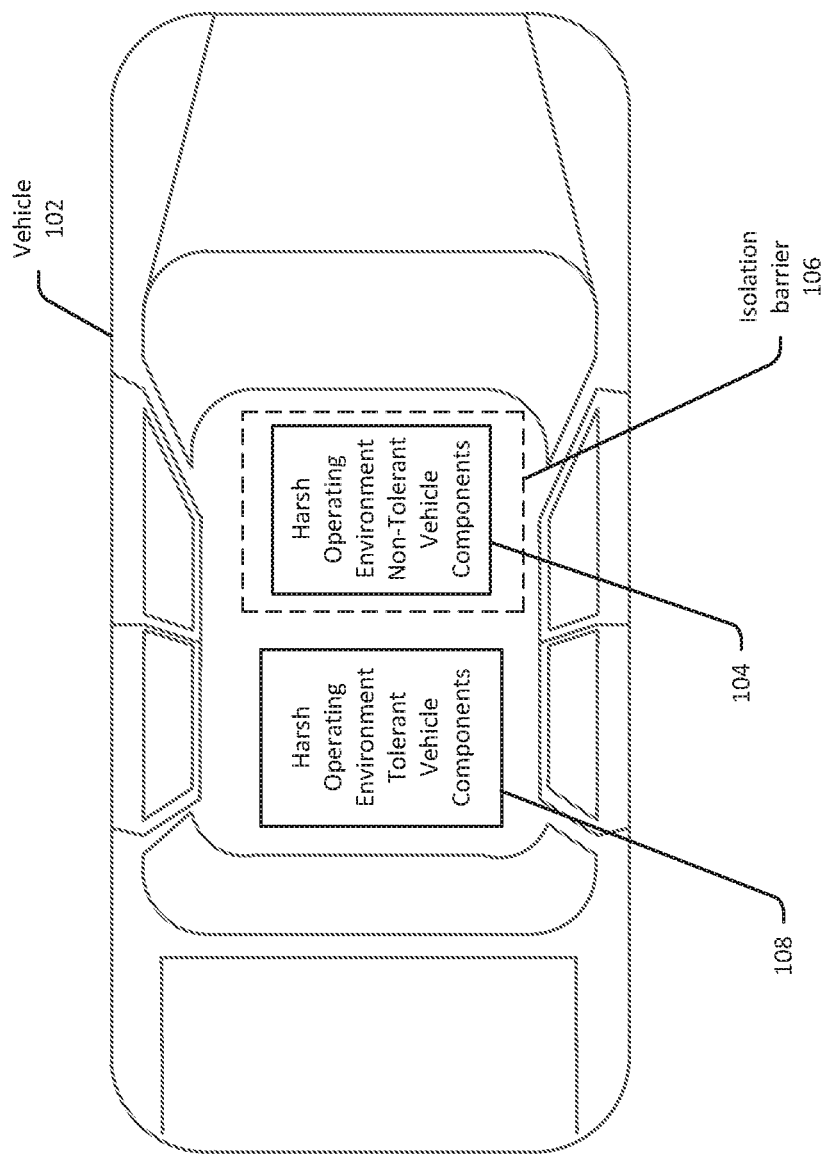
FIG. 1 is a schematic depiction of the isolation of non-tolerant vehicle components from a harsh operating environment in a vehicle in accordance with example embodiments of the invention.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Modern vehicles, such as autonomous vehicles, include a large number of vehicle components needed to support many different vehicle functionalities/technologies. Vehicle components may include a variety of types of mechanical and electrical components. For instance, vehicle components may include various processors/processing circuits such as graphical processing units (GPUs), central processing units (CPUs), application specific integrated circuits (ASICs), field programmable gate arrays (FPGAs), or the like. Vehicle components, in particular autonomous vehicle components, may further include various types of sensors including, without limitation, Light Detection and Ranging (LiDAR) sensors, radars, cameras, Global Positioning System (GPS) receivers, sonar-based sensors, ultrasonic sensors, inertial measurement units (IMUs), accelerometers, gyroscopes, magnetometers, far infrared (FIR) sensors, and so forth.

Some vehicle components may be automotive-grade components that are capable of tolerating harsh operating environments within the vehicle. For example, such components may be designed so to as to withstand high temperatures, high voltages, high levels of evaporation, or large fluctuations in any of these parameters that may be present in a vehicle operating environment. In some instances, vehicle components such as various sensors (e.g., a LiDAR, a camera, etc.) may be provided on an exterior of the vehicle. Thus, while such components may not be exposed to a harsh internal operating environment of a vehicle, they are exposed to harsh conditions in the external environment such as wind, precipitation, high temperatures, or the like. Sensors or other components provided at an exterior of a vehicle may be contained in housings that protect the components from the natural elements.

While some vehicle components are automotive-grade, and thus, capable of tolerating harsh internal vehicle operating conditions, other components, such as commercially available components, may not be able to tolerate such conditions. Commercial components may include, for example, computer processing components such as GPUs, CPUs, FPGAs, ASICs, or the like; sensors such as GPS receivers, accelerometers, or the like; and so forth. Such commercial components may be more susceptible to failure due to the harsh operating environment in the vehicle.

Embodiments of the invention overcome technical problems specifically arising in the realm of computer-based technology, and more specifically, in the realm of autonomous vehicle technology. In particular, example embodiments of the invention provide technical solutions to the above-described technical problem of increased susceptibility to failure for commercial vehicle components due to harsh vehicle operating environments. Such technical solutions are disclosed in the form of systems, methods, non-transitory computer-readable media, techniques, and methodologies for isolating commercial components from a harsh vehicle operating environment to increase the longevity of such components and to decrease their failure rate.

Such technical solutions are also disclosed in the form of systems, methods, non-transitory computer-readable media, techniques, and methodologies for monitoring the operational health status of vehicle components for failure, and upon detecting failure of a component, initiating a task reassignment and fault recovery process. In this manner, even if a commercial vehicle component fails despite the reduced failure rate achieved by isolating the component from the harsh vehicle operating environment, processing load handled by the component prior to failure can be offloaded to one or more other vehicle components while a fault recovery process is initiated for the component. When the failed component is operational again, the vehicle may revert back to the task assignment in place prior to the component failure, may continue with the current task assignment, or may transition to another different task reassignment. Example embodiments of the invention thus yield an improvement to existing vehicle technologies by providing a mechanism for both reducing the failure rate of commercial vehicle components as well as a mechanism for compensating for failure of such components through vehicle component task reassignment and fault recovery.

FIG. 1 is a schematic depiction of a vehicle 102 in accordance with an example embodiment of the invention. The vehicle 102 may be, for example, an autonomous vehicle. FIG. 1 schematically depicts the isolation of non-tolerant vehicle components 104 from a harsh operating environment in the vehicle 102. The non-tolerant vehicle components 104 may include, for example, commercial components such as GPUs, CPUs, or other types of controllers/processors/processing circuits. The non-tolerant vehicle components 104 may also include any type of commercial-grade sensor that is not capable of tolerating the temperatures, voltages, or other conditions present in a harsh internal vehicle operating environment. In example embodiments, an isolation barrier 106 may be provided that serves to isolate the vehicle components 104 which are not tolerant to the harsh internal vehicle environment from that environment including from any vehicle components 108 that are tolerant to the harsh environment.

In example embodiments, the isolation barrier 106 may create an environment for the non-tolerant components 104 that exhibits less harsh operating conditions than the internal vehicle operating environment external to the isolation barrier 106. More specifically, the isolation barrier 106 may create a sub-environment for the non-tolerant components 104 such that the non-tolerant components 104 experience less harsh internal operating conditions within the sub-environment. For instance, the isolation barrier 106 may have an insulating property that lowers the operating temperature range within the sub-environment created by the barrier 106 as compared to the internal vehicle operating environment outside the barrier 106. As another non-limiting example, the isolation barrier 106 may include materials, surface features, physical configurations, or the like that result in lower voltage operating ranges and/or less harsh evaporative conditions within the sub-environment created by the barrier 106. It should be appreciated that the above examples are merely illustrative, and that the isolation barrier 106 may include any characteristics that result in the sub-environment created by the isolation barrier 106 exhibiting operating parameters/conditions that are more favorable for the components 104 that are not tolerant to the internal vehicle operating environment outside the barrier 106.

In example embodiments, the less harsh sub-environment created by the isolation barrier 106 may extend the performance life of the harsh environment non-tolerant components 104 and reduce their failure rate. In particular, because the components 104 experience less harsh operating conditions (e.g., lower temperatures, lower voltages, etc.) within the sub-environment created by the isolation barrier 106, the failure rate associated with the components 104 may decrease. Despite this reduced failure rate, some of the harsh environment non-tolerant components 104 may continue to experience premature failure or other performance degradation. To address this, example embodiments of the invention provide fault detection, task reassignment, and fault recovery mechanisms for vehicle components. While such mechanisms are applicable to both the harsh operating environment tolerant vehicle components 108 as well as the non-tolerant vehicle components 104, the harsh operating environment non-tolerant components 104 may be more likely to fail than the tolerant vehicle components 108 (despite the reduced failure rate achieved by the isolation barrier 106), and thus, example embodiments of the invention may be particularly advantageous for addressing failures among the components 104.

Figure 2:
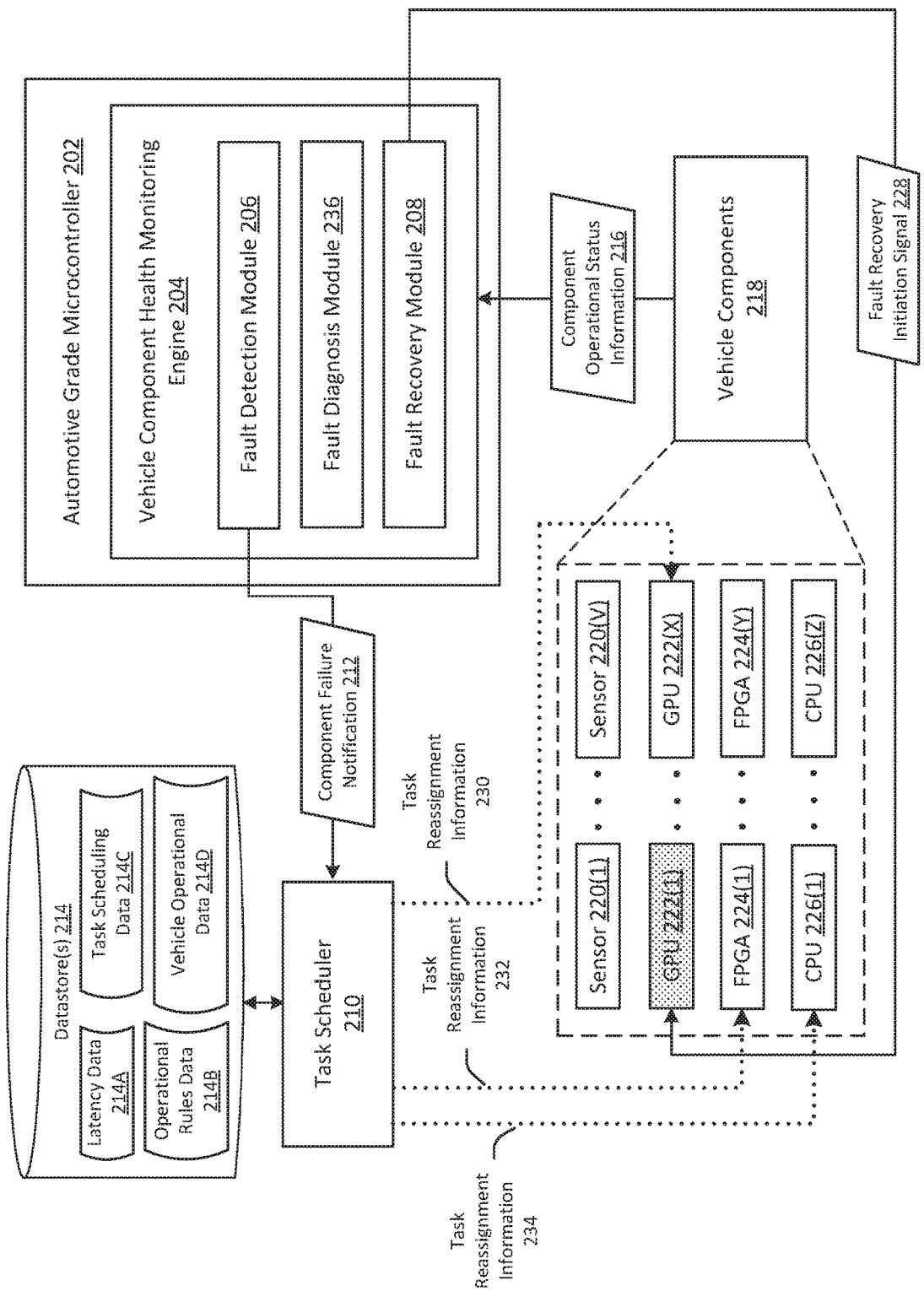
FIG. 2 schematically illustrates vehicle component health monitoring and fault detection in accordance with example embodiments of the invention.
Figure 3:
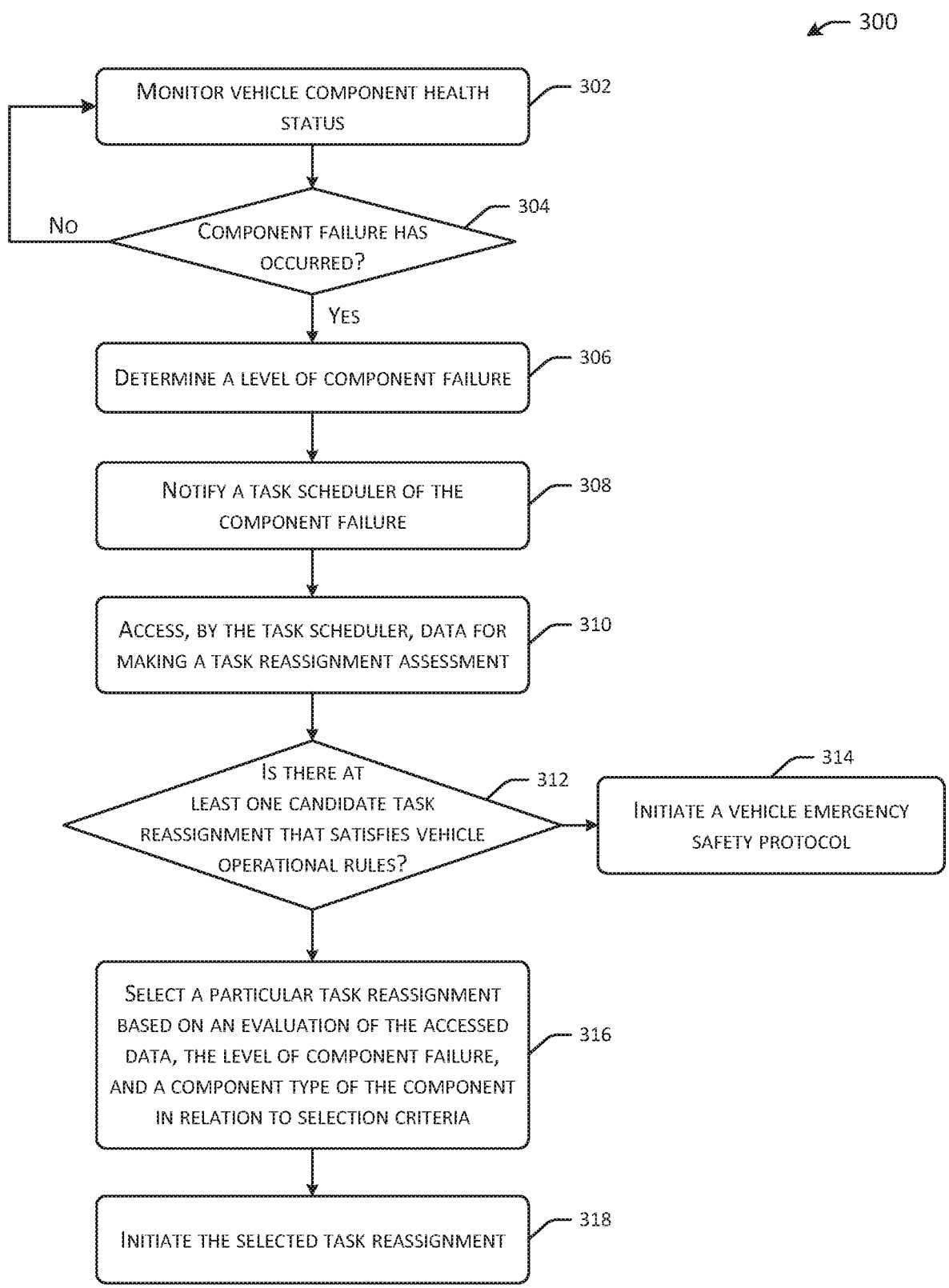
FIG. 3 is a process flow diagram of an illustrative method for vehicle component health monitoring and fault detection in accordance with example embodiments of the invention.
Figure 4:
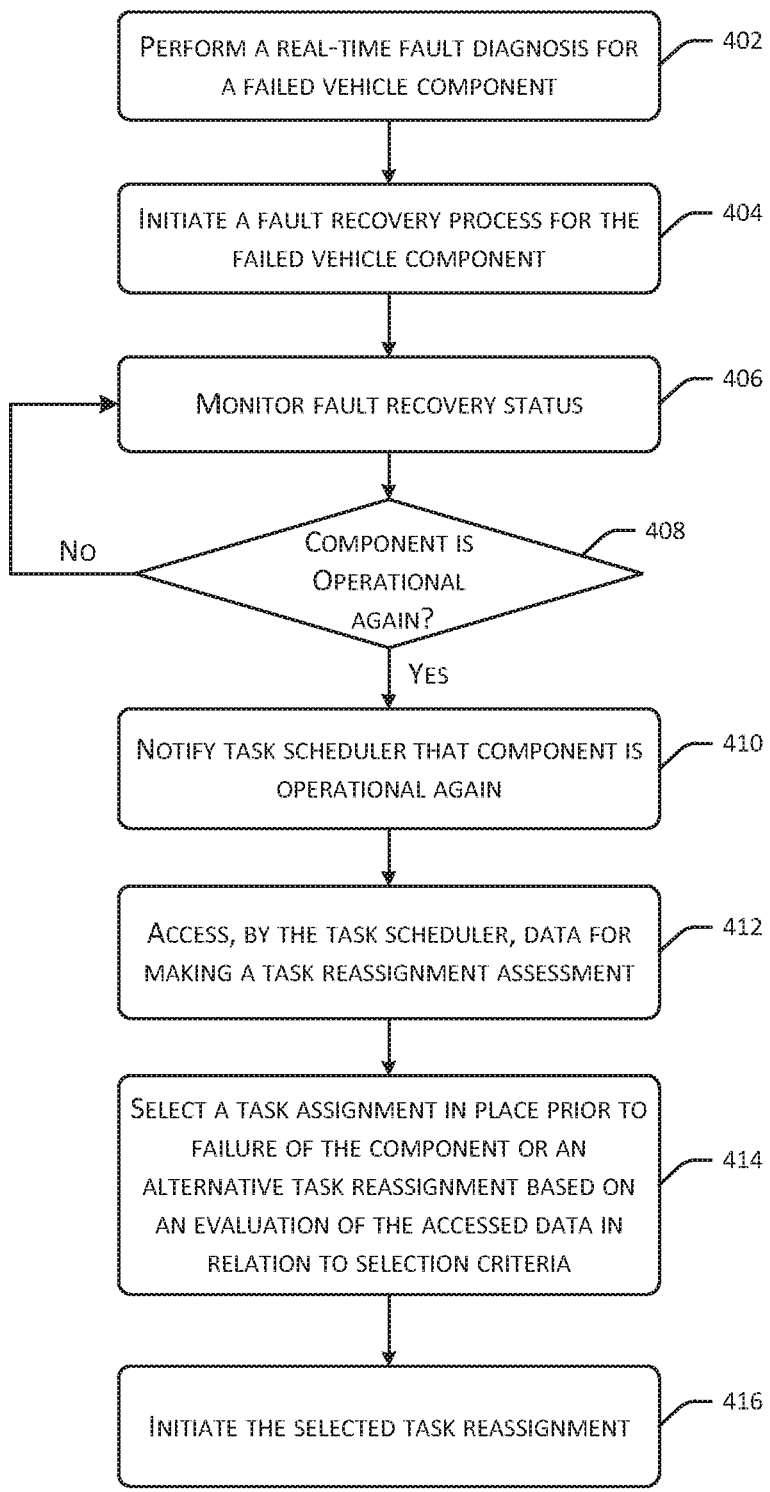
FIG. 4 is a process flow diagram of an illustrative method for performing a fault recovery process for a failed vehicle component in accordance with example embodiments of the invention.

FIG. 2 schematically illustrates vehicle component health monitoring and fault detection in accordance with example embodiments of the invention. FIG. 3 is a process flow diagram of an illustrative method 300 for vehicle component health monitoring and fault detection in accordance with example embodiments of the invention. FIG. 4 is a process flow diagram of an illustrative method 400 for performing a fault recovery process for a failed vehicle component in accordance with example embodiments of the invention. FIGS. 3 and 4 will each be described hereinafter in conjunction with FIG. 2.

Each operation of the method 300 and/or the method 400 can be performed by one or more of the engines/program modules depicted in FIG. 2 or 5, whose operation will be described in more detail hereinafter. These engines/program modules can be implemented in any combination of hardware, software, and/or firmware. In certain example embodiments, one or more of these engines/program modules can be implemented, at least in part, as software and/or firmware modules that include computer-executable instructions that when executed by a processing circuit cause one or more operations to be performed. In example embodiments, these engines/program modules may be customized computer-executable logic implemented within a customized computing machine such as a customized FPGA or ASIC. A system or device described herein as being configured to implement example embodiments of the invention can include one or more processing circuits, each of which can include one or more processing units or cores. Computer-executable instructions can include computer-executable program code that when executed by a processing core can cause input data contained in or referenced by the computer-executable program code to be accessed and processed by the processing core to yield output data.

Referring first to FIG. 2, fault detection and recovery functionality described herein may be provided by a vehicle component health monitoring engine 204 operating in conjunction with a task scheduler 210. In some embodiments, the vehicle component health monitoring engine 204 may include a set of software/firmware instructions executable by one or more processing units. In some embodiments, the set of instructions constituting the vehicle component health monitoring engine 204 may be stored in on-board memory (e.g., random access memory (RAM), read-only memory (ROM), etc.) of a microcontroller 202. The microcontroller 202 may be an automotive-grade integrated circuit capable of withstanding the harsh operating environment conditions in the vehicle. For instance, referring also to FIG. 1, the microcontroller 202 may be located outside the isolation barrier 106, and thus, may be subjected to the conditions of the harsh operating environment. In other example embodiments, the microcontroller 202 may be located within the sub-environment created by the isolation barrier 106. Regardless of the microcontroller's location within the vehicle, the microcontroller 202 may include one or more processing units (e.g., a CPU with one or more processing cores) configured to access an on-board memory of the microcontroller 202 and execute stored instructions of the vehicle component health monitoring engine 204 to monitor an operational health status of vehicle components (e.g., one or more of the components 104, and optionally, one or more of the components 108); perform fault detection, diagnosis, and recovery processes; and initiate task reassignments responsive to detected failure of a monitored vehicle component.

It should be appreciated that the specific implementation shown in FIG. 2 is merely illustrative. In some embodiments, the task scheduler 210 may include computer/machine-executable instructions that reside in on-board memory of the microcontroller 204 and that are executable by a processor of the microcontroller 204. In other example embodiments, the task scheduler 210 may include software/firmware modules that reside on other computer-readable storage media provided in a vehicle and are executable by processing unit(s) (e.g., a microprocessor, an electronic control unit, etc.) other than those associated with the microcontroller 204. Further, in some embodiments, the vehicle component health monitoring engine 204 may be executable by a microprocessor or other processing unit different from the microcontroller 204. In addition, in some embodiments, the engine 204 and/or the task scheduler 210 may be implemented in hardware as, for example, hardwired logic of a customized computing device like an ASIC and FPGA.

The vehicle component health monitoring engine 204 may include one or more software, firmware, and/or hardware modules. For instance, the engine 204 may include a fault detection module 206 that may be configured to provide functionality in connection with monitoring a health status of vehicle components, detecting failure of a vehicle component, and informing the task scheduler 210 of the failure to initiate a task reassignment process. The engine 204 may further include a fault diagnosis module 236 that may be configured to provide real-time fault diagnosis functionality. More specifically, responsive to detection of a vehicle component failure, the fault diagnosis module 236 may run various diagnostics on the failed component to characterize the nature of the failure the component has experienced. The engine 204 may further include a fault recovery module 208 that may be configured to provide functionality in connection with initiating a recovery process for a vehicle component that has experienced failure. In some example embodiments, the fault diagnosis module 236 may send information to the fault recovery module 208 characterizing the nature of the failure experienced by a vehicle component, and the fault recovery module 208 may initiate a fault recovery process that is specifically tailored to the characteristics of the component failure. The functionality of the modules 206, 208 will be described in more detail in reference to the illustrative methods 300, 400 of FIGS. 3 and 4, respectively.

Referring now to FIG. 3 in conjunction with FIG. 2, at block 302 of the method 300, the vehicle component health monitoring engine 204 may monitor an operational health status of various vehicle components 218. The vehicle components 218 may include one or more of the components 104 (FIG. 1) such as GPUs, CPUs, ASICs, FPGAs, certain types of sensors, or the like—which may be commercial components that are not tolerant to harsh internal vehicle operating environments. The vehicle components 218 monitored by the engine 204 may optionally further include one or more of the harsh operating environment tolerant components 108 (FIG. 1).

In example embodiments, the engine 204 may receive operational status information 216 from the vehicle components 218. The operational status information 216 may include status information pertinent to each component being monitored. For instance, in the case of a GPU, corresponding operational status information 216 may include data relating to various operational parameters of the GPU such as current processing load; peak processing load over some period of time; average processing load over some period of time; clock frequency; operating temperature data; operating voltage data; latency data associated with calculations/processing performed by the GPU; and so forth. Similarly, operational status information 216 indicative of operational parameters may be received from other types of vehicle components as well.

In some embodiments, the vehicle component health monitoring engine 204 may pull the operational status information 216 from the components 218 at periodic intervals. In other example embodiments, the components 218 may send the operational status information 216 to the engine 204 periodically, in-batch, or in response to a triggering event. Example triggering events may include, without limitation, a change in an operational parameter by more than a threshold amount; a change in an operational parameter to below or above a corresponding a threshold value; or the like. In some embodiments, the components 218 may communicate the operational status information 216 to the engine 204 via one or more wired or wireless network connections using one or more communication protocols (e.g., BLUETOOTH). In other example embodiments, one or more of the vehicle components 218 may communicate with the engine 204, or more generally, the microcontroller 202, via one or more dedicated buses.

Still referring to FIG. 3 in conjunction with FIG. 2, at block 304 of the method 300, the vehicle component health monitoring engine 204, or more specifically, the fault detection module 206 may determine whether failure has occurred for a vehicle component 218. In some embodiments, a component may be deemed to have failed when the component is entirely non-operational. In other example embodiments, a component failure/fault may be detected when corresponding operational status information 216 indicates that one or more operational parameters for the component have values that fail to meet minimum threshold levels and/or that exceed maximum threshold levels, potentially for some minimum threshold period of time. For example, a GPU or a CPU may be considered to have failed if the processing latency for the GPU is above a maximum allowable latency, potentially for at least a threshold period of time. As another non-limiting example, a GPU or a CPU may be considered to have failed if a clock rate/frequency of the component fails below a minimum clock rate/frequency, potentially for at least a threshold period of time. It should be appreciated that other criteria/indicia of component failure are contemplated.

At block 306 of the method 300, the fault detection module 206 may determine a failure level associated with the vehicle component failure. In some embodiments, the failure level may be one of a set of discrete levels of failure representing progressively higher degrees of performance degradation of the vehicle component. For example, each potential failure level may correspond to one or more operational parameters of the component deviating from expected value(s) (or ranges of expected values) by at least a corresponding threshold amount. In some embodiments, the failure level may be a score/value assigned to the failure of the component from a range of continuous or discrete scores/values. The failure level score may be determined by evaluating one or more operational parameters in relation to expected value(s) (or expected range(s) of values). The failure level score may be obtained by aggregating differences in operational parameter value(s) from expected value(s) (or expected range(s) of values), and potentially assigning different weights to different operational parameters based on the impact of the operational parameter on the overall operational health status of the vehicle component. As a non-limiting example, determining the failure level of a vehicle component may include first determining a latency associated with task processing performed by the vehicle component subsequent to its failure or an amount of latency increase associated with the failure of the vehicle component, and then determining the failure level from a mapping of failure levels to latency ranges or ranges of latency changes.

At block 308 of the method 300, the fault detection module 206 may send a component failure notification 212 to the task scheduler 210. The component failure notification 212 may include an identifier of the particular vehicle component that experienced failure as well as an indication of the determined failure level. In some embodiments, the component failure notification 212 may include the values of particular operational parameters that contributed to or that are indicative of the component's failure. For instance, the component failure notification 212 may include processing latency values for the failed component and corresponding expected values/ranges that indicate failure of the component.

At block 310 of the method 300, the task scheduler 210 may access various types of data required to make a task reassignment assessment. Generally speaking, the task scheduler 210 may be configured to determine and manage task processing assignments among various vehicle components. For instance, the task scheduler 210 may be configured to determine how a collection of tasks are to be allocated among various vehicle components for processing, where such vehicle components may include one or more sensors 220(1)-220(V); one or more GPUs 222(1)-222(X); one or more FPGAs 224(1)-224(Y); one or more CPUs 226(1)-226(Z); and so forth. The variables V, X, Y, and Z may each be any integer greater than or equal to one. It should be appreciated that FIG. 2 merely depicts example vehicle components that the task scheduler 210 may allocate task processing to, and is not exhaustive.

In example embodiments, at block 310, the task scheduler 210 may access one or more datastores 214 to retrieve various types of data that the task scheduler 210 may use to make a task reassignment assessment in light of the failure of the vehicle component identified in the component failure notification 212. Such data may include, without limitation, latency data 214A, operational rules data 214B, task scheduling data 214C, and vehicle operational data 214D. The latency data 214A may include, for example, data indicative of respective processing latencies associated with various vehicle components handling various task processing. Processing latency may refer to an amount of time/delay associated with a vehicle component (e.g., a GPU) completing processing for a particular task or a portion of a task. Processing latency may be dictated by the type of component (e.g., a CPU may generally exhibit greater latency than a GPU); the amount of task processing (processing load) being handled by the component (and conversely the available processing capacity of the component); the size of a communication bus or network via which the component sends task processing output to another vehicle component such as a controller/processor configured to utilize the results of the task processing; and so forth.

The operational rules data 214B may include data indicative of vehicle operational rules that specify various relationships that must be met between different vehicle/component operational parameters. For instance, the operational rules data 214B may specify different maximum vehicle speeds that are achievable/permitted for different processing latencies (or ranges of processing latency). In particular, as processing latency increases—which means that the delay associated with vehicle components completing task processing increases—then the vehicle speed of an autonomous vehicle may need to correspondingly decrease. For example, as latency associated with object detection, instance segmentation, automated vehicle navigation, or the like increases, the autonomous vehicle may need to reduce its vehicle speed in order to ensure the results of the processing are returned in a timeframe that allows the vehicle to be safely operated.

In some embodiments, the operational rules data 214B may specify correspondences between different maximum vehicle speeds and aggregate processing latency (or ranges thereof) associated with multiple vehicle components such as multiple GPUs, CPUs, etc. For instance, the aggregate processing latency associated with multiple GPUs and CPUs (or a range of aggregate processing latencies) may be correlated to a particular vehicle speed or a range of vehicle speeds. In other example embodiments, the operational rules data 214B may specify correspondences between different maximum vehicle speeds and individual processing latencies associated with particular vehicle components. For instance, the processing latency of a particular GPU (or a range thereof) may be correlated to a particular vehicle speed (or a range thereof).

In example embodiments, the task scheduling data 214C may include data indicative of the allocation of task processing among different vehicle components. For instance, the task scheduling data 214C may indicate a current allocation of task processing for each of multiple vehicle components. The task scheduling data 214C may further indicate respective available processing capacity for each of multiple vehicle components. The task scheduler 210 may be configured to assess processing load across vehicle components using the task scheduling data 214C in order to determine which vehicle component(s) may have processing capacity to take on additional task processing and/or to redistribute processing load between vehicle components.

In example embodiments, the vehicle operational data 214D may include data indicative of various vehicle operational parameters such as current vehicle speed; historical vehicle speeds; average vehicle speed over some period of time; internal vehicle operating environment data such as temperature data, voltage data, or the like; vehicle environmental data such as minimum speed required for a roadway traversed by the vehicle, vehicle navigation data, weather data, etc.; and so forth. The task scheduler 210 may be configured to evaluate the latency data 214A in relation to the vehicle operational data 214D to determine whether a current task assignment specified by the task scheduling data 214C complies with the vehicle operational rules data 214B or whether a task reassignment is needed, and if so, to determine any candidate task reassignments that comply with the operational rules data 214B.

In an example embodiment, the vehicle component determined to have failed and identified in the component failure notification 212 may be GPU 222(1), depicted with shading in FIG. 2. Upon receiving notification of failure of the GPU 222(1), and optionally, an indication of a failure level associated with the failure of GPU 222(1), the task scheduler 210 may access the task scheduling data 214C to determine a current task allocation among vehicle components. In addition, the task scheduler 210 may access the latency data 214A to determine current processing latencies associated with task processing currently being performed by various vehicle components. The task scheduler 210 may further access the operational rules data 214B and the vehicle operational data 214D to identify, based on the latency data 214A, the task scheduling data 214C, and the vehicle operational data 214D, one or more candidate task reassignments that comply with the operational rules data 214B.

At block 312 of the method 300, the task scheduler 210 may determine whether there is at least one task reassignment that satisfies vehicle operational rules specified by the operational rules data 214B. In some embodiments, the task scheduler 210 may determine that a candidate task reassignment exists whereby at least a portion of the task processing performed by the vehicle component that experienced failure (GPU 222(1)) may be offloaded to another GPU (e.g., GPU 222(X)). This determination may include a determination that an operational health of the GPU 222(X) satisfies one or more operational health criteria. For example, the task scheduler 210 may determine that the GPU 222(X) has at least a threshold amount of processing capacity available. As another non-limiting example, the task scheduler 210 may determine that offloading the at least a portion of the task processing performed by the GPU 222(1) prior to failure to the GPU 222(X) would result in less than the threshold amount of performance degradation for the GPU 222(X). It should be appreciated that the above operational health criteria is merely illustrative and not exhaustive.

In some example embodiments, the task scheduler 210 may first attempt to identify one or more candidate task reassignments that would involve offloading task processing performed by a failed vehicle component prior to failure to one or more other vehicle components of the same component type as the failed vehicle component. For instance, assuming failure of GPU 222(1), the task scheduler 210 may first assess whether one or more other GPUs (e.g., GPU 222(X)) can take on at least a portion of the task processing performed by GPU 222(1) prior to failure while still satisfying operational health criteria for the GPU(s) to which the task processing would be offloaded. Offloading task processing previously performed by a failed vehicle component to another vehicle component of the same type may be desirable because it may result in no change in processing latency, a decrease in processing latency, or a smaller increase in processing latency than would occur if the task processing were to be offloaded to one or more vehicle components of a different component type than the failed vehicle component.

In some embodiments, the task scheduler 210 may further determine that offloading task processing from the failed GPU 222(1) to one or more other GPUs (e.g., GPU 222(X)) would also satisfy minimum vehicle operational requirements in addition to satisfying the operational health criteria. For example, the task scheduler 210 may determine that offloading at least a portion of the task processing from GPU 222(1) to GPU 222(X) would result in no decrease in processing latency, and thus, no change to a vehicle operational parameter such as vehicle speed would be needed. As another non-limiting example, the task scheduler 210 may determine that offloading at least a portion of the task processing from GPU 222(1) to GPU 222(X) would result in some increase in processing latency, in which case, the task scheduler 210 may determine the amount of processing latency increase that would occur. The task scheduler 210 may then determine a corresponding decrease in vehicle speed that would be needed to compensate for the increase in the processing latency. If the vehicle speed after the decrease still complies with the operational rules data 214B (e.g., the vehicle speed after decrease is still above a threshold minimum vehicle speed for a roadway currently being traversed by the vehicle), then the task scheduler 210 may proceed with the task reassignment.

In some embodiments, some portion of the task processing performed by the failed vehicle component (e.g., GPU 222(1)) prior to failure may continue to be performed by the vehicle component after failure. As previously described, failure of a vehicle component may correspond to different levels of failure, at least some of which may not correspond to complete component failure. Thus, in some scenarios, the GPU 222(1) may have experienced a performance degradation that corresponds to a particular failure level, but may nonetheless still be partially operational, and thus, capable of still handling, after experiencing failure, some portion of the task processing that it was handling prior to failure.

In some example embodiments, the task scheduler 210 may determine that no vehicle component of the same component type as the failed vehicle component is available to take on task processing from the failed vehicle component. For instance, the task scheduler 210 may determine that offloading task processing from failed GPU 222(1) to any one or more of the other GPUs 222(2)-222(X) would result in a degradation in performance and/or an increase in processing latency for the component(s) to which the processing is offloaded that would result in operational health criteria not being satisfied for any of the GPUs 222(2)-222(X) being considered for the task offloading and/or would result in operational rules specified in the operational rules data 214B not being satisfied. In such example embodiments, the task scheduler 210 may assess whether at least a portion of task processing performed by the failed vehicle component can be offloaded to one or more other vehicle components of a different component type than the failed vehicle component while ensuring that the operational health criteria of such components is satisfied and vehicle operational rules are satisfied.

For instance, assuming again that GPU 222(1) has failed and that no candidate task reassignment can be made to one or more other GPUs 222(2)-222(X), the task scheduler 210 may determine that at least a portion of the task processing performed by GPU 222(1) prior to failure can be offloaded to one or more FPGAs (e.g., FPGA 224(1)) and/or one or more CPUs (e.g., CPU 226(1)). In some embodiments, the task scheduler 210 may first determine whether a task reassignment can be achieved using only one or more CPUs, given that a smaller increase in processing latency is likely to occur if the task processing is offloaded to only CPU(s) as opposed to a combination of CPU(s) and other processing unit(s) such as FPGA(s).

In fact, in some example embodiments, the task scheduler 210 may assess task reassignments based on a hierarchy of component type. For instance, assuming that GPU 222(1) has failed, the task scheduler 210 may first determine whether a candidate task reassignment is available that involves offloading all task processing that needs to be offloaded from the failed GPU 222(1) to one or more other GPUs 222(2)-222(X). This may be an ideal task reassignment as it may involve no change in processing latency, only a minimal increase in processing latency, or, in some cases, a decrease in processing latency as compared to the task assignment prior to failure of the GPU 222(1). If no such candidate task reassignment exists that would satisfy both operational health criteria for the component(s) selected for the offloading as well as the operational rules data 214B, the task scheduler 210 may then determine whether a candidate task reassignment is available that involves offloading task processing from the failed GPU 222(1) to a combination of one or more other GPUs 222(2)-222(X) and one or more CPUs 226(1)-226(Z), where CPUs are one level lower in the component hierarchy, for example. If no such task reassignment is available, the task scheduler 210 may then proceed to determine if a task reassignment is available involving only CPU(s), followed by a combination of CPU(s) and FPGA(s), followed by only FPGA(s), and so forth.

It should be appreciated that GPUs, CPUs, FPGAs, and the like are discussed herein merely for illustrative purposes. For instance, in other example embodiments, the task scheduler 210 may assess potential task reassignments with respect to other types of vehicle components such as ASICs or the like. In some embodiments, certain types of vehicle components may be at the same level in the component hierarchy as other different types of components. For instance, an ASIC and an FPGA may be at the same level in the component hierarchy such that the task scheduler 210 does not exhibit, in connection with its task reassignment assessment, a preference between the two based on component type alone. It should further be appreciated that the task scheduler 210 may, as part of its task reassignment assessment, first attempt to identify a task reassignment involving vehicle components at the same level or at a higher level (if possible) than the failed vehicle component in the component hierarchy. For instance, if a CPU failed (e.g., 226(1)), the task scheduler 210 may first attempt to identify a task reassignment that would involve offloading task processing from the failed CPU to a GPU or a combination of GPUs before considering task reassignments involving other CPUs. Similarly, if an FPGA fails, the task scheduler 210 may first attempt to identify a task reassignment that would involve offloading task processing from the failed FPGA to a GPU, a combination of GPUs, a combination of GPU(s) and CPU(s), a CPU, or a combination of CPUs before considering task reassignments involving other FPGAs.

As previously described, upon failure of GPU 222(1), the task scheduler 210 may determine that there is no candidate task reassignment involving only other GPU(s) that would satisfy operational health criteria for such GPU(s) as well as the operational rules data 214B, and may instead identify task candidate task reassignments that include one or more CPUs 226(1)-226(Z) and/or one or more FPGAs 224(1)-224(Y). The task scheduler 210 may determine that such task reassignments are appropriate candidates by ensuring that changes in operational parameters that occur as a result of the task reassignment would not violate operational rules for the vehicle such as a minimum threshold vehicle speed that needs to be maintained.

For example, the task scheduler 210 may determine an amount by which an operational parameter value such as processing latency may increase after the task reassignment. The task scheduler 210 may then determine, based on the vehicle operational data 214D (e.g., a current vehicle speed), an amount by which the vehicle speed would need to be reduced to compensate for the increase in processing latency. The task scheduler 210 may then evaluate this reduced vehicle speed against the operational rules data 214B (e.g., a minimum threshold vehicle speed that needs to be maintained for the roadway currently being traversed by the vehicle) to determine if safe vehicle operation can occur at the reduced vehicle speed. In some embodiments, the task scheduler 210 may evaluate the amount by which the vehicle speed will need to be reduced against a threshold permitted maximum vehicle speed change. For instance, if the vehicle is traversing highway at a relatively high speed, a vehicle speed change beyond a threshold amount may not be permitted due to safety concerns. In such example embodiments, task reassignment that would require more than a threshold change in vehicle speed may be rejected as a candidate.

In some embodiments, characteristics associated with the environment being traversed by the vehicle may determine the extent of the increase in processing latency that occurs as a result of task reassignment, and thus, the extent to which the vehicle speed must be reduced to compensate for the increased processing latency. For instance, if the vehicle's surrounding environment includes a large number of obstacles, the processing latency associated with performing tasks such as object detection and instance segmentation may increase significantly if processing for such tasks is offloaded, at least in part, from the failed GPU 222(1) to, for example, to one or more CPUs 226(1)-226(Z). As a result of this larger increase in processing latency, the reduction in vehicle speed that is needed may increase correspondingly. Thus, environmental factors may influence the amount by which processing latency increases due to task offloading associated with a task reassignment, and thus, the extent of the corresponding vehicle speed reduction that is required. As such, a task reassignment that involves offloading task processing from a failed component (e.g., the failed GPU 222(1)) to a particular set of vehicle components (e.g., one or more CPUs 226(1)-226(Z)) may be a candidate task reassignment under certain environmental conditions and not others depending on whether the resultant increase in processing latency can be compensated for by a reduction in vehicle speed that is still above the threshold minimum vehicle speed that needs to be maintained by the vehicle.

Referring still to FIG. 3 in conjunction with FIG. 2, if the task scheduler 210 identifies no candidate task reassignment that satisfies the operational rules data 214B (a negative determination at block 312), then the task scheduler 210 may inform the vehicle component health monitoring engine 204, and an emergency safety protocol may be initiated at block 314 of the method 300. As previously described, in example embodiments, the absence of a candidate task reassignment may indicate that the task scheduler 210 was unable to identify one or more vehicle components to which task processing performed by the failed component (e.g., GPU 222(1)) can be offloaded while ensuring that operational health criteria for such component(s) is maintained, and while still complying with vehicle operational rules specified by the operational rules data 214B such as a minimum vehicle speed.

In such example embodiments, the emergency safety protocol may include bringing the autonomous vehicle to a stop at a location that is identified as safe, turning on warning indicators (e.g., hazard lights), and so forth. In some embodiments, the vehicle may remain stopped until a fault recovery process (the method 400 of FIG. 4 described later in this disclosure) is completed and the failed vehicle component (e.g., GPU 222(1)) is operational again or until a new candidate task reassignment becomes available that does satisfy both operational health criteria for component(s) implicated in the task reassignment as well as operational rules for the vehicle (e.g., a minimum vehicle speed that must be maintained). In some embodiments, after initiating the emergency safety protocol at block 314, the task scheduler 210 may immediately begin reassessing data retrieved from the datastore(s) 214 (e.g., latency data 214A, task scheduling data 214C, and/or vehicle operational data 214D) in light of the data contained in the component failure notification 212 (e.g., component type of the failed vehicle component, failure level for the component, etc.) to determine if a candidate task reassignment has become available that satisfies the operational rules data 214B. In other example embodiments, the task scheduler 210 may initiate a configurable delay to allow for the failed component's operational health to improve or be restored and/or for processing capacity of other vehicle component(s) to free up before again assessing the viability of a task reassignment.

On the other hand, in response to a positive determination at block 312 indicating that at least one candidate task reassignment has been identified by the task scheduler 210, the task scheduler 210 may proceed to select, at block 316 of the method 300, a particular candidate task reassignment for implementation. The task scheduler 210 may then initiate the selected task reassignment at block 318 of the method 300. In some embodiments, a vehicle speed change necessitated by the task reassignment may be initiated prior to or at least partially concurrently with implementation of the task reassignment.

In example embodiments, the task scheduler 210 may initiate the selected task reassignment by sending task reassignment information to the vehicle component(s) that will pick up the processing load from the failed vehicle component. For instance, assuming again that GPU 222(1) has failed, the task scheduler 210 may send task reassignment information 230 to one or more other GPUs 222(2)-222(X) to which at least a portion of the task processing performed by the failed GPU 222(1) prior to failure will be offloaded as part of the selected task reassignment. Additionally, or alternatively, the task scheduler 210 may send task reassignment information 232 to one or more FPGAs 224(1)-222(Y) and/or task reassignment information to one or more CPUs 226(1)-226(Z) to which at least a portion of the task processing performed by the failed GPU 222(1) prior to failure may be offloaded as part of the selected task reassignment.

The task scheduler 210 may be configured to select a particular task reassignment from among multiple potential task reassignments based on one or more selection criteria. As a non-limiting example, the task scheduler 210 may select a task reassignment that results in the smallest increase in processing latency, and thus, the smallest required decrease in vehicle speed. For instance, the task scheduler 210 may select a candidate task reassignment that involves offloading processing from the failed GPU 222(1) to only one or more other GPUs over a candidate task reassignment that involves offloading the task processing, at least in part, to component(s) with less processing capacity such as a CPU, FPGA, or an ASIC. As another non-limiting example, the task scheduler 210 may select a task reassignment that includes the greatest number of vehicle components at higher levels in the component hierarchy. For instance, the task scheduler 210 may select a candidate task reassignment that involves offloading task processing from the failed GPU 222(1) in a distributed manner to three different CPUs over a candidate task reassignment that involves offloading the task processing to 2 CPUs and 2 FPGAs.

FIG. 4 depicts an illustrative vehicle component fault recovery method 400 that may, in some embodiments, be performed at least partially concurrently with the fault detection method 300. Referring now to FIG. 4 in conjunction with FIG. 2, at block 402 of the method 400, the fault diagnosis module 236 may perform a real-time diagnosis of a failed vehicle component. The real-time diagnosis may include running diagnostics on the failed component to assess and characterize the failure experienced by the vehicle component (e.g., GPU 222(1)). In some example embodiments, running diagnostics may include accessing and comparing latency data 214A and/or vehicle operational data 214D corresponding to the failed vehicle component's operation for a first period of time prior to the component's detected failure and a second period of time subsequent to the detected failure. The fault diagnosis module 236 may determine changes in operational patterns/activity of the vehicle component between the first and second periods of time and may compare such changes to various criteria/thresholds to characterize the nature of the failure experienced by the vehicle component. For instance, the greater the deviation between one or more pre-failure operational parameters and one or more post-failure operational parameters (e.g., processing latency prior to failure vs. processing failure subsequent to failure) and/or the greater the deviation of an operational parameter from a preconfigured value, the greater the severity level the fault diagnosis module 236 may associate with the detected failure.

At block 404 of the method 400, the fault recovery module 208 may initiate a fault recovery process for the failed vehicle component. For example, the fault recovery module 208 may send a fault recovery initiation signal 228 to the failed vehicle component (e.g., GPU 222(1)) to initiate the fault recovery process. In some embodiments, the fault recovery initiation signal 228 may instruct the failed component to initiate a self-recovery process. In other example embodiments, the fault recovery module 208 may perform the recovery itself or instruct one or more other vehicle components to perform the recovery. The example method 400 assumes that the failure level of the failed component (e.g., GPU 222(1)) is such that the component is capable of recovering from the fault(s) that led to failure.

In example embodiments, the fault diagnosis module 236 may send failure characteristic information to the fault recovery module 208 that indicates how the vehicle component's failure has been characterized. The failure characteristic information may indicate the vehicle component that failed, a severity level assigned to the failure, a type of the failure, and so forth. In some example embodiments, the fault diagnosis module 236 may also provide diagnostic information to the fault recovery module 208 indicative of operational parameters of the failed component pre and post failure. The fault recovery module 208 may assess the failure characteristic information and the diagnostic information to determine an appropriate fault recovery process for the failed vehicle component. In some embodiments, the fault recovery module 208 may select from a set of predetermined fault recovery processes for the type of vehicle component and the type of failure experienced. In other example embodiments, the fault recovery module 208 may modify a fault recovery process to generate a custom tailored recovery process for the failed component based on the particular metrics observed in connection with the component's failure.

At block 406 of the method 400, the fault recovery module 208 may monitor the fault recovery status for the failed vehicle component. In some embodiments, the fault recovery module 208 may periodically ping the failed component (e.g., the GPU 222(1)) for recovery status information indicating the degree to which the component has recovered to its operational status prior to failure.

At block 408 of the method 400, the fault recovery module 208 may determine whether the failed vehicle component is operational again. The vehicle component may be deemed operational again when one or more operational parameters for the component meet corresponding minimum threshold values. For instance, the GPU 222(1) may be deemed operational again, the GPU 222(1) is again available to handle at least a threshold amount of processing load. As another non-limiting example, the GPU 222(1) may be deemed operational again when a processing latency associated with task processing performed by the GPU 222(1) again falls below a maximum allowable processing latency. The fault recovery module 208 may continue to periodically or continuously monitor the fault recovery status for the failed vehicle component as long as the fault recovery information indicates that the failed component is not yet operational (a negative determination at block 408). On the other hand, in response to a positive determination at block 408 indicating that the failed vehicle component has once again reached a minimum viable operational status, the method 400 may proceed to block 410, where the fault recovery module 208 may inform the task scheduler 210 that the failed vehicle component is once again operational.

Upon receiving the indication that the failed vehicle component is once again operational, the task schedule 210 may proceed to access, at block 412 of the method 400, data from the datastore(s) 214 to again make a task reassignment assessment. More specifically, the task scheduler 210 may access the latency data 214A (which may have been updated to reflect the processing latencies associated with the task reassignment that was adopted in response to failure of the vehicle component); the operational rules data 214B; the task scheduling data 214C (which may also have been updated to reflect the task reassignment that was adopted in response to the vehicle component failure); and the vehicle operational data 214D (which also may have been updated to reflect, for example, the new vehicle speed necessitated by the prior adoption of the task reassignment). The task scheduler 210 may then determine one or more candidate task reassignments that can be adopted in light of the recovery of operational status for the previously failed component. Included among these candidate task reassignments may be the task assignment that was in place immediately prior to failure of the vehicle component, the current task assignment that was adopted in response to failure of the vehicle component, or another different task reassignment.

Then, at block 414 of the method 400, the task scheduler 210 may select one of the candidate task reassignments based on selection criteria, which may include any of the selection criteria previously described. The task scheduler 210 may then initiate (or maintain) the selected task assignment at block 416 of the method 400. In some embodiments, despite the previously failed vehicle component becoming operational again, the task scheduler 210 may decide to maintain the current task assignment that was adopted in response to failure of the vehicle component. For example, under the current task assignment, one or more other GPUs may have picked up the processing load from the failed GPU 222(1), and these other GPUs may be performing the task processing as efficiently or potentially more efficiently than the GPU 222(1) had performed the processing prior to failure. In other example embodiments, the task scheduler 210 may revert back to the task assignment that was in place prior to failure of the GPU 222(1) or may select an altogether different task reassignment based on the processing latencies identified in the latency data 214A, for example.

Hardware Implementation

Figure 5:
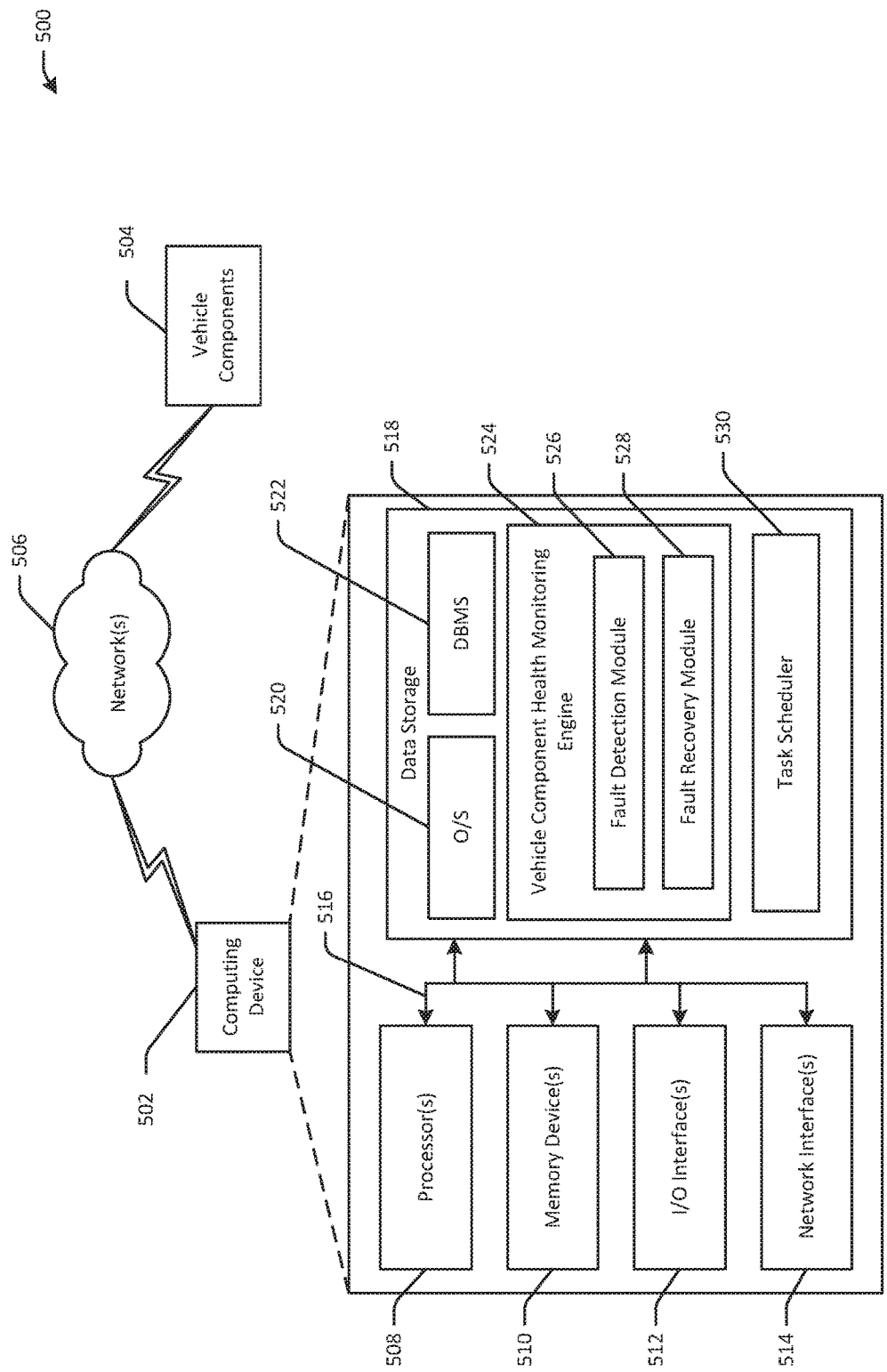
FIG. 5 is a schematic block diagram illustrating an example networked architecture configured to implement example embodiments of the invention.

FIG. 5 is a schematic block diagram illustrating an example networked architecture 500 configured to implement example embodiments of the invention. The networked architecture 500 can include one or more special-purpose computing devices 502 communicatively coupled via one or more networks 506 to various vehicle components 504. The vehicle components 504 may include any of the example types of components described herein including, without limitation, commercial components (e.g., GPUs, CPUs, ASICs, FPGAs, etc.); automotive-grade components (e.g., automotive-grade microcontrollers, other mechanical/electrical automotive parts, etc.); and on-board vehicle sensors (e.g., LiDAR, radars, cameras, GPS receivers, sonar-based sensors, ultrasonic sensors, IMUs, accelerometers, gyroscopes, magnetometers, FIR sensors, etc.). The vehicle components 504 may be provided on an exterior or in an interior of a vehicle such as an autonomous vehicle. The special-purpose computing device(s) 502 may include devices that are integrated with a vehicle and may receive data from the components 504 (e.g., operational health data, sensor data, etc.) via a local network connection (e.g., WiFi, Bluetooth, Dedicated Short Range Communication (DSRC), or the like). In other example embodiments, the special-purpose computing device(s) 502 may be provided remotely from a vehicle and may receive data from the components 504 via one or more long-range networks.

The special-purpose computing device(s) 502 may be hard-wired to perform the techniques; may include circuitry or digital electronic devices such as one or more ASICs or FPGAs that are persistently programmed to perform the techniques; and/or may include one or more hardware processors programmed to perform the techniques pursuant to program instructions in firmware, memory, other storage, or a combination thereof. The special-purpose computing device(s) 502 may also combine custom hard-wired logic, ASICs, or FPGAs with custom programming to accomplish the techniques. The special-purpose computing device(s) 502 may be desktop computer systems, server computer systems, portable computer systems, handheld devices, networking devices or any other device or combination of devices that incorporate hard-wired and/or programmed logic to implement the techniques.

The special-purpose computing device(s) may be generally controlled and coordinated by operating system software 520, including mobile operating systems such as iOS, Android, Chrome OS, or the like, desktop operating systems, mainframe operating systems, or other compatible operating systems. In other embodiments, the computing device(s) 402 may be controlled by a proprietary operating system. The operating system software 420 may control and schedule computer processes for execution; perform memory management; provide file system, networking, and I/O services; and provide user interface functionality, such as a graphical user interface ("GUI").

While the computing device(s) 502 and/or the sensors 504 may be described herein in the singular, it should be appreciated that multiple instances of any such component can be provided and functionality described in connection any particular component can be distributed across multiple instances of such a component. In certain example embodiments, functionality described herein in connection with any given component of the architecture 500 can be distributed among multiple components of the architecture 500. For example, at least a portion of functionality described as being provided by a computing device 502 may be distributed among multiple such computing devices 502.

The network(s) 506 can include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. The network(s) 506 can have any suitable communication range associated therewith and can include, for example, global networks (e.g., the Internet), metropolitan area networks (MANs), wide area networks (WANs), local area networks (LANs), or personal area networks (PANs). In addition, the network(s) 506 can include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 502 can include one or more processors (processor(s)) 508, one or more memory devices 510 (generically referred to herein as memory 510), one or more input/output ("I/O") interface(s) 512, one or more network interfaces 514, and data storage 518. The computing device 502 can further include one or more buses 516 that functionally couple various components of the computing device 502. The data storage may store one or more engines, program modules, components, or the like including, without limitation, a vehicle component health monitoring engine 524 and a task scheduler 530. The vehicle component health monitoring engine 524 may further include one or more engines, program modules, components, or the like including, without limitation, a fault detection module 526 and a fault recovery module 528. Each of the engines/components depicted in FIG. 5 may include logic for performing any of the processes or tasks described earlier in connection with correspondingly named engines/components. In certain example embodiments, any of the depicted engines/components may be implemented in hard-wired circuitry within digital electronic devices such as one or more ASICs or FPGAs that are persistently programmed to perform corresponding techniques. In example embodiments, the vehicle component health monitoring engine 524 and the task scheduler 530 may execute on an automotive-grade microcontroller or the like.

The bus(es) 516 can include at least one of a system bus, a memory bus, an address bus, or a message bus, and can permit the exchange of information (e.g., data (including computer-executable code), signaling, etc.) between various components of the computing device 502. The bus(es) 516 can include, without limitation, a memory bus or a memory controller, a peripheral bus, an accelerated graphics port, and so forth. The bus(es) 516 can be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 510 can include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, can include non-volatile memory. In certain example embodiments, volatile memory can enable faster read/write access than non-volatile memory. However, in certain other example embodiments, certain types of non-volatile memory (e.g., FRAM) can enable faster read/write access than certain types of volatile memory.

In various implementations, the memory 510 can include multiple different types of memory such as various types of static random access memory (SRAM), various types of dynamic random access memory (DRAM), various types of unalterable ROM, and/or writeable variants of ROM such as electrically erasable programmable read-only memory (EE-PROM), flash memory, and so forth. The memory 510 can include main memory as well as various forms of cache memory such as instruction cache(s), data cache(s), translation lookaside buffer(s) (TLBs), and so forth. Further, cache memory such as a data cache can be a multi-level cache organized as a hierarchy of one or more cache levels (L1, L2, etc.). In example embodiments, the memory 510 may include the data storage 106(1)-106(P) and/or the data storage 120 depicted in FIG. 1. Alternatively, the data storage 106(1)-106(P) may be hard disk storage forming part of the data storage 518 and/or the data storage 120 may be a form of RAM or cache memory that is provided as part of the FOV semantics computing machine 524 itself.

The data storage 518 can include removable storage and/or non-removable storage including, but not limited to, magnetic storage, optical disk storage, and/or tape storage. The data storage 518 can provide non-volatile storage of computer-executable instructions and other data. The memory 510 and the data storage 518, removable and/or non-removable, are examples of computer-readable storage media (CRSM) as that term is used herein. The data storage 518 can store computer-executable code, instructions, or the like that can be loadable into the memory 510 and executable by the processor(s) 508 to cause the processor(s) 508 to perform or initiate various operations. The data storage 518 can additionally store data that can be copied to memory 510 for use by the processor(s) 508 during the execution of the computer-executable instructions. Moreover, output data generated as a result of execution of the computer-executable instructions by the processor(s) 508 can be stored initially in memory 510 and can ultimately be copied to data storage 518 for non-volatile storage.

More specifically, the data storage 518 can store one or more operating systems (O/S) 520 and one or more database management systems (DBMS) 522 configured to access the memory 510 and/or one or more external datastore(s) (not depicted) potentially via one or more of the networks 506. In addition, the data storage 518 may further store one or more program modules, applications, engines, computer-executable code, scripts, or the like. For instance, any of the engines/components depicted in FIG. 5 may be implemented as software and/or firmware that includes computer-executable instructions (e.g., computer-executable program code) loadable into the memory 510 for execution by one or more of the processor(s) 508 to perform any of the techniques described herein.

Although not depicted in FIG. 5, the data storage 518 can further store various types of data utilized by engines/components of the computing device 502. Such data may include, without limitation, sensor data, feedback data including historical sensor operational data, initial parameter data, or the like. Any data stored in the data storage 518 can be loaded into the memory 510 for use by the processor(s) 508 in executing computer-executable program code. In addition, any data stored in the data storage 518 can potentially be stored in one or more external datastores that are accessible via the DBMS 522 and loadable into the memory 510 for use by the processor(s) 508 in executing computer-executable instructions/program code.

The processor(s) 508 can be configured to access the memory 510 and execute computer-executable instructions/program code loaded therein. For example, the processor(s) 508 can be configured to execute computer-executable instructions/program code of the various engines/components of the FOV semantics computing machine 524 to cause or facilitate various operations to be performed in accordance with one or more embodiments of the invention. The processor(s) 508 can include any suitable processing unit capable of accepting data as input, processing the input data in accordance with stored computer-executable instructions, and generating output data. The processor(s) 508 can include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 508 can have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 508 can be made capable of supporting any of a variety of instruction sets.

Referring now to other illustrative components depicted as being stored in the data storage 518, the 0/S 520 can be loaded from the data storage 518 into the memory 510 and can provide an interface between other application software executing on the computing device 502 and hardware resources of the computing device 502. More specifically, the 0/S 520 can include a set of computer-executable instructions for managing hardware resources of the computing device 502 and for providing common services to other application programs. In certain example embodiments, the 0/S 520 can include or otherwise control execution of one or more of the engines/program modules stored in the data storage 518. The O/S 520 can include any operating system now known or which can be developed in the future including, but not limited to, any server operating system, any mainframe operating system, or any other proprietary or non-proprietary operating system.

The DBMS 522 can be loaded into the memory 510 and can support functionality for accessing, retrieving, storing, and/or manipulating data stored in the memory 510, data stored in the data storage 518, and/or data stored in external datastore(s). The DBMS 522 can use any of a variety of database models (e.g., relational model, object model, etc.) and can support any of a variety of query languages. The DBMS 522 can access data represented in one or more data schemas and stored in any suitable data repository. Datastore(s) that may be accessible by the computing device 502 via the DBMS 522, can include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the computing device 502, the input/output (I/O) interface(s) 512 can facilitate the receipt of input information by the computing device 502 from one or more I/O devices as well as the output of information from the computing device 502 to the one or more I/O devices. The I/O devices can include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components can be integrated into the computing device 502 or can be separate therefrom. The I/O devices can further include, for example, any number of peripheral devices such as data storage devices, printing devices, and so forth.

The I/O interface(s) 512 can also include an interface for an external peripheral device connection such as universal serial bus (USB), FireWire, Thunderbolt, Ethernet port or other connection protocol that can connect to one or more networks. The I/O interface(s) 512 can also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The computing device 502 can further include one or more network interfaces 514 via which the computing device 502 can communicate with any of a variety of other systems, platforms, networks, devices, and so forth. The network interface(s) 514 can enable communication, for example, with the sensors 504 and/or one or more other devices via one or more of the network(s) 506. In example embodiments, the network interface(s) 514 provide a two-way data communication coupling to one or more network links that are connected to one or more of the network(s) 506. For example, the network interface(s) 514 may include an integrated services digital network (ISDN) card, a cable modem, a satellite modem, or a modem to provide a data communication connection to a corresponding type of telephone line. As another non-limiting example, the network interface(s) 514 may include a local area network (LAN) card to provide a data communication connection to a compatible LAN (or a wide area network (WAN) component to communicate with a WAN). Wireless links may also be implemented. In any such implementation, the network interface(s) 514 may send and receive electrical, electromagnetic, or optical signals that carry digital data streams representing various types of information.

A network link typically provides data communication through one or more networks to other data devices. For example, a network link may provide a connection through a local network to a host computer or to data equipment operated by an Internet Service Provider (ISP). The ISP, in turn, may provide data communication services through the world wide packet data communication network now commonly referred to as the "Internet". Local networks and the Internet both use electrical, electromagnetic, or optical signals that carry digital data streams. The signals through the various network(s) 504 and the signals on network links and through the network interface(s) 514, which carry the digital data to and from the computing device 502, are example forms of transmission media. In example embodiments, the computing device 502 can send messages and receive data, including program code, through the network(s) 506, network links, and network interface(s) 514. For instance, in the Internet example, a server might transmit a requested code for an application program through the Internet, the ISP, a local network, and a network interface 514. The received code may be executed by a processor 508 as it is received, and/or stored in the data storage 518, or other non-volatile storage for later execution.

It should be appreciated that the engines depicted in FIG. 5 as part of the computing device 502 are merely illustrative and not exhaustive. In particular, functionality can be modularized in any suitable manner such that processing described as being supported by any particular engine can alternatively be distributed across multiple engines, program modules, components, or the like, or performed by a different engine, program module, component, or the like. Further, one or more depicted engines may or may not be present in certain embodiments, while in other embodiments, additional engines not depicted can be present and can support at least a portion of the described functionality and/or additional functionality. In addition, various engine(s), program module(s), script(s), plug-in(s), Application Programming Interface(s) (API(s)), or any other suitable computer-executable code hosted locally on the computing device 502 and/or hosted on other computing device(s) (e.g., 502) accessible via one or more of the network(s) 502, can be provided to support functionality provided by the engines depicted in FIG. 5 and/or additional or alternate functionality. In addition, engines that support functionality described herein can be implemented, at least partially, in hardware and/or firmware and can be executable across any number of computing devices 502 in accordance with any suitable computing model such as, for example, a client-server model, a peer-to-peer model, and so forth.

It should further be appreciated that the computing device 502 can include alternate and/or additional hardware, software, and/or firmware components beyond those described or depicted without departing from the scope of the invention. More particularly, it should be appreciated that software, firmware, and/or hardware components depicted as forming part of the computing device 502 are merely illustrative and that some components may or may not be present or additional components may be provided in various embodiments. It should further be appreciated that each of the engines depicted and described represent, in various embodiments, a logical partitioning of supported functionality. This logical partitioning is depicted for ease of explanation of the functionality and may or may not be representative of the structure of software, hardware, and/or firmware for implementing the functionality.

In general, the terms engine, program module, or the like, as used herein, refer to logic embodied in hardware, firmware, and/or circuitry, or to a collection of software instructions, possibly having entry and exit points, written in a programming language, such as, for example, Java, C or C++. A software engine/module may be compiled and linked into an executable program, installed in a dynamic link library, or may be written in an interpreted programming language such as, for example, BASIC, Perl, or Python. It will be appreciated that software engines/modules may be callable from other engines/modules or from themselves, and/or may be invoked in response to detected events or interrupts. Software engines/modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. "Open source" software refers to source code that can be distributed as source code and/or in compiled form, with a well-publicized and indexed means of obtaining the source, and optionally with a license that allows modifications and derived works. Software instructions may be embedded in firmware and stored, for example, on flash memory such as erasable programmable read-only memory (EPROM). It will be further appreciated that hardware modules/engines may include connected logic units, such as gates and flip-flops, and/or may be further include programmable units, such as programmable gate arrays or processors.

Example embodiments are described herein as including engines or program modules. Such engines/program modules may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a field programmable gate array (FPGA) or an application specific integrated circuit (ASIC). A hardware engine may also include programmable logic or circuitry that is temporarily configured by software to perform certain operations. For example, a hardware engine may include a general-purpose processor or other programmable processor configured by software, in which case, the configured processor becomes a specific machine uniquely tailored to perform the configured functions and no longer constitute general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the term "engine" or "program module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware engines are temporarily configured (e.g., programmed), each of the hardware engines need not be configured or instantiated at any one instance in time. For example, where a hardware engine includes a general-purpose processor configured by software to become a special-purpose processor, the general-purpose processor may be configured as respectively different special-purpose processors (e.g., comprising different hardware engines) at different times. Software accordingly can configure a particular processor or processors, for example, to constitute a particular hardware engine at a given instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute an implementation of a hardware engine. Similarly, the methods described herein may be at least partially processor-implemented, with a particular processor or processors being an example of hardware. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations of example methods described herein may be distributed among multiple processors, not only residing within a single machine, but deployed across a number of machines. In some example embodiments, the processors may be located in a single geographic location (e.g., within a home environment, an office environment, or a server farm). In other example embodiments, the processors may be distributed across a number of geographic locations.

The present invention may be implemented as a system, a method, and/or a computer program product. The computer program product may include a computer readable storage medium (or media) having computer readable program instructions embodied thereon for causing a processor to carry out aspects of the present invention.

The computer readable storage medium is a form of non-transitory media, as that term is used herein, and can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. The computer readable storage medium, and non-transitory media more generally, may include non-volatile media and/or volatile media. A non-exhaustive list of more specific examples of a computer readable storage medium includes the following: a portable computer diskette such as a floppy disk or a flexible disk; a hard disk; a random access memory (RAM), a read-only memory (ROM), an erasable programmable read-only memory (EPROM or Flash memory), a static random access memory (SRAM), or any other memory chip or cartridge; a portable compact disc read-only memory (CD-ROM); a digital versatile disk (DVD); a memory stick; a solid state drive; magnetic tape or any other magnetic data storage medium; a mechanically encoded device such as punch-cards or raised structures in a groove having instructions recorded thereon or any physical medium with patterns of holes; any networked versions of the same; and any suitable combination of the foregoing.

Non-transitory media is distinct from transmission media, and thus, a computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Non-transitory media, however, can operate in conjunction with transmission media. In particular, transmission media may participate in transferring information between non-transitory media. For example, transmission media can include coaxial cables, copper wire, and/or fiber optics, including the wires that include at least some of the bus(es) 502. Transmission media can also take the form of acoustic or light waves, such as those generated during radio-wave and infra-red data communications.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider (ISP)). In some embodiments, electronic circuitry including, for example, programmable logic circuitry, FPGAs, or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The various features and processes described above may be used independently of one another or may be combined in various ways. All possible combinations and sub-combinations are intended to fall within the scope of the invention. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed partially, substantially, or entirely concurrently, or the blocks may sometimes be executed in the reverse order, depending upon the functionality involved.

It should be emphasized that many variations and modifications may be made to the above-described embodiments, the elements of which are to be understood as being among other example embodiments of the invention. All such modifications and variations are intended to be included herein within the scope of the invention. While example embodiments of the invention may be referred to herein, individually or collectively, by the term "invention," this is merely for convenience and does not limit the scope of the invention to any single disclosure or concept if more than one is, in fact, disclosed. The foregoing description details certain embodiments of the invention. It will be appreciated, however, that no matter how detailed the foregoing appears in text, the invention can be practiced in many ways. It should be noted that the use of particular terminology when describing certain features or aspects of the invention should not be taken to imply that the terminology is being redefined herein to be restricted to including any specific characteristics of the features or aspects of the invention with which that terminology is associated.

The embodiments illustrated herein are described in sufficient detail to enable those skilled in the art to practice the teachings disclosed. Other embodiments may be used and derived therefrom, such that structural and logical substitutions and changes may be made without departing from the scope of the invention. The Detailed Description, therefore, is not to be taken in a limiting sense, and the scope of various embodiments is defined only by the appended claims, along with the full range of equivalents to which such claims are entitled.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

As used herein, the term "or" may be construed in either an inclusive or exclusive sense. Moreover, plural instances may be provided for resources, operations, or structures described herein as a single instance. Additionally, boundaries between various resources, operations, program modules, engines, and/or datastores are somewhat arbitrary, and particular operations are illustrated in a context of specific illustrative configurations. Other allocations of functionality are envisioned and may fall within a scope of various embodiments of the invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the invention as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

What is claimed is:

1. A computer-implemented method for vehicle component fault detection, the method comprising:
   monitoring a health status of a first vehicle component over a period of time;
   detecting failure of the first vehicle component;
   determining a failure level associated with the failure of the first vehicle component;
   determining, based at least in part on the failure level and a component type of the first vehicle component, a vehicle component task reassignment, the component type of the first vehicle component comprising a graphics processing unit (GPU); and
   implementing the vehicle component task reassignment at least in part by offloading at least a portion of the task processing performed by the first vehicle component prior to failure to a second vehicle component, wherein an operational health of the second vehicle component satisfies one or more operational health criteria, and wherein the implementing of the vehicle component task reassignment comprises:
      determining whether a first candidate reassignment that offloads the portion of the task processing to one or more other GPUs is available, while satisfying operational health criteria of the one or more other GPUs and operation rules of the vehicle;
      in response to determining that the first candidate reassignment is unavailable, determining whether a second candidate reassignment that offloads the portion of the task processing to one or more central processing units (CPUs) is available, while satisfying the operational health criteria of the one or more CPUs and the operation rules of the vehicle;
      in response to determining that the second candidate reassignment is unavailable, determining whether a third candidate reassignment that offloads the portion of the task processing to one or more field-programmable gate arrays (FPGAs) is available, while satisfying the operational health criteria of the one or more FPGAs and the operation rules of the vehicle; and
      selectively implementing the vehicle component task reassignment based on an availability of the first candidate reassignment, the second candidate reassignment, and the third candidate reassignment.

2. The computer-implemented method of claim 1, wherein detecting the failure of the first vehicle component comprises determining that a latency associated with the task processing performed by the first vehicle component has increased by at least a threshold amount during the period of time.

3. The computer-implemented method of claim 2, wherein determining the failure level associated with the failure of the first vehicle component comprises:

determining a latency associated with the task processing performed by the first vehicle component subsequent to the failure of the first vehicle component or an amount of latency increase associated with the failure of the first vehicle component; and determining the failure level from a mapping of failure levels to latency ranges or ranges of latency changes.

4. The computer-implemented method of claim 1, wherein determining that offloading the at least a portion of the task processing performed by the first vehicle component prior to failure to the second vehicle component would satisfy minimum vehicle operational requirements comprises:

determining a change in latency associated with the second vehicle component performing the at least a portion of the task processing instead of the first vehicle component;

determining that the change in latency requires a corresponding change in a vehicle speed; and determining that the change in the vehicle speed would result in the vehicle speed after the change being not less than a threshold minimum vehicle speed.

5. The computer-implemented method of claim 4, further comprising initiating the change in the vehicle speed in connection with implementing the vehicle component task reassignment.

6. The computer-implemented method of claim 1, wherein determining the vehicle component task reassignment comprises:

identifying a third vehicle component associated with a component type that is the same as the component type of the first vehicle component;

determining that offloading the at least a portion of the task processing performed by the first vehicle component prior to failure to the third vehicle component would result in at least a threshold amount of performance degradation for the third component;

identifying the second vehicle component, wherein a component type of the second vehicle component is different from the component type of the first vehicle component; and determining that the operational health of the second vehicle component satisfies one or more operational health criteria.

7. The computer-implemented method of claim 6, wherein determining that the operational health of the second vehicle component satisfies one or more operational health criteria comprises determining that the second vehicle component has at least a threshold amount of available processing capacity.

8. The computer-implemented method of claim 6, wherein determining that the operational health of the second vehicle component satisfies one or more operational health criteria comprises determining that offloading the at least a portion of the task processing performed by the first vehicle component prior to failure to the second vehicle component would result in less than the threshold amount of performance degradation.

9. The computer-implemented method of claim 1, further comprising:

performing a real-time fault diagnosis for the first vehicle component;

initiating, based at least in part on the real-time fault diagnosis, a fault recovery process for the first vehicle component;

determining that an operational health of the first vehicle component has been restored to at least a threshold operational health level; and reverting back to a vehicle component task assignment prior to the failure of the first vehicle component, wherein reverting back to the vehicle component task assignment comprises reassigning the at least a portion of the task processing from the second vehicle component back to the first vehicle component.

10. The method of claim 1, further comprising:

determining a type and a severity of the failure based on an extent of a deviation of an operational parameter, compared to a threshold, prior to failure and following the failure, and wherein the a vehicle component task reassignment is determined based on the type and the severity of the failure.

11. The method of claim 1, wherein the implementing of the vehicle component task reassignment comprises:

selecting a candidate reassignment that offloads the portion of the task processing to a highest number of GPUs and a lowest number of other components over another candidate reassignment that offloads the portion of the task processing to a lower number of GPUs and a higher number of the other components, while satisfying operational health criteria of the one or more other GPUs and operation rules of the vehicle.

12. A system for vehicle component fault detection, the system comprising:

at least one processor; and at least one memory storing computer-executable instructions, wherein the at least one processor is configured to access the at least one memory and execute the computer-executable instructions to:

monitor a health status of a first vehicle component over a period of time;

detect failure of the first vehicle component;

determine a failure level associated with the failure of the first vehicle component;

determine, based at least in part on the failure level and a component type of the first vehicle component, a vehicle component task reassignment, the component type of the first vehicle component comprising a graphics processing unit (GPU); and implement the vehicle component task reassignment at least in part by offloading at least a portion of the task processing performed by the first vehicle component prior to failure to a second vehicle component, wherein an operational health of the second vehicle component satisfies one or more operational health criteria, and wherein the implementing of the vehicle component task reassignment comprises:

determining whether a first candidate reassignment that offloads the portion of the task processing to one or more other GPUs is available, while satisfying operational health criteria of the one or more other GPUs and operation rules of the vehicle;

in response to determining that the first candidate reassignment is unavailable, determining whether a second candidate reassignment that offloads the portion of the task processing to one or more central processing units (CPUs) is available, while satisfying the operational health criteria of the one or more CPUs and the operation rules of the vehicle;

in response to determining that the second candidate reassignment is unavailable, determining whether a third candidate reassignment that offloads the portion of the task processing to one or more field-programmable gate arrays (FPGAs) is available, while satisfying the operational health criteria of the one or more FPGAs and the operation rules of the vehicle; and selectively implementing the vehicle component task reassignment based on an availability of the first candidate reassignment, the second candidate reassignment, and the third candidate reassignment.

13. The system of claim 12, wherein the at least one processor is configured to detect the failure of the first vehicle component by executing the computer-executable instructions to determine that a latency associated with the task processing performed by the first vehicle component has increased by at least a threshold amount during the period of time.

14. The system of claim 13, wherein the at least one processor is configured to determine the failure level associated with the failure of the first vehicle component by executing the computer-executable instructions to:

determine a latency associated with the task processing performed by the first vehicle component subsequent to the failure of the first vehicle component or an amount of latency increase associated with the failure of the first vehicle component; and determine the failure level from a mapping of failure levels to latency ranges or ranges of latency changes.

15. The system of claim 12, wherein the at least one processor is configured to determine that offloading the at least a portion of the task processing performed by the first vehicle component prior to failure to the second vehicle component would satisfy minimum vehicle operational requirements by executing the computer-executable instructions to:

determine a change in latency associated with the second vehicle component performing the at least a portion of the task processing instead of the first vehicle component;

determine that the change in latency requires a corresponding change in a vehicle speed; and determine that the change in the vehicle speed would result in the vehicle speed after the change being not less than a threshold minimum vehicle speed.

16. The system of claim 15, wherein the at least one processor is further configured to execute the computer-executable instructions to initiate the change in the vehicle speed in connection with implementing the vehicle component task reassignment.

17. The system of claim 12, wherein the at least one processor is configured to determine the vehicle component task reassignment by executing the computer-executable instructions to:

identify a third vehicle component associated with a component type that is the same as the component type of the first vehicle component;

determine that offloading the at least a portion of the task processing performed by the first vehicle component prior to failure to the third vehicle component would result in at least a threshold amount of performance degradation for the third component;

identify the second vehicle component, wherein a component type of the second vehicle component is different from the component type of the first vehicle component; and determine that the operational health of the second vehicle component satisfies one or more operational health criteria.

18. The system of claim 17, wherein the at least one processor is configured to determine that the operational health of the second vehicle component satisfies one or more operational health criteria by executing the computer-executable instructions to determine that the second vehicle component has at least a threshold amount of available processing capacity.

19. The system of claim 17, wherein the at least one processor is configured to determine that the operational health of the second vehicle component satisfies one or more operational health criteria by executing the computer-executable instructions to determine that offloading the at least a portion of the task processing performed by the first vehicle component prior to failure to the second vehicle component would result in less than the threshold amount of performance degradation.

20. The system of claim 12, wherein the at least one processor is further configured to execute the computer-executable instructions to:

performing a real-time fault diagnosis for the first vehicle component;

initiate, based at least in part on the real-time fault diagnosis, a fault recovery process for the first vehicle component;

determine that an operational health of the first vehicle component has been restored to at least a threshold operational health level; and revert back to a vehicle component task assignment prior to the failure of the first vehicle component, wherein reverting back to the vehicle component task assignment comprises reassigning the at least a portion of the task processing from the second vehicle component back to the first vehicle component.

* * * * *